United States Patent
Chieze et al.

(10) Patent No.: US 9,258,612 B2
(45) Date of Patent: Feb. 9, 2016

(54) TRANSMISSION, RECEPTION AND IDENTIFICATION METHODS, SECURITY PROCESSOR AND INFORMATION RECORDING MEDIUM FOR SAID METHODS

(75) Inventors: Quentin Chieze, Paris (FR); David Leporini, Rungis (FR)

(73) Assignee: Viaccess, Paris L a Défense (FR)

( * ) Notice: Subject to any disclaimer, the term of this patent is extended or adjusted under 35 U.S.C. 154(b) by 699 days.

(21) Appl. No.: 13/142,888

(22) PCT Filed: Dec. 14, 2009

(86) PCT No.: PCT/EP2009/067025
§ 371 (c)(1),
(2), (4) Date: Jun. 30, 2011

(87) PCT Pub. No.: WO2010/076163
PCT Pub. Date: Jul. 8, 2010

(65) Prior Publication Data
US 2011/0280399 A1 Nov. 17, 2011

(30) Foreign Application Priority Data
Dec. 31, 2008 (FR) ..................................... 08 07518

(51) Int. Cl.
*H04L 29/06* (2006.01)
*H04N 21/4623* (2011.01)
*H04N 21/4367* (2011.01)
*H04N 21/442* (2011.01)

(52) U.S. Cl.
CPC ....... *H04N 21/4623* (2013.01); *H04N 21/4367* (2013.01); *H04N 21/44236* (2013.01)

(58) Field of Classification Search
CPC .. H04L 9/00; H04N 21/4623; H04N 21/4367; H04N 21/44236
USPC ............................. 380/255; 370/466; 705/50
See application file for complete search history.

(56) References Cited

U.S. PATENT DOCUMENTS

| | | | | | |
|---|---|---|---|---|---|
| 5,825,889 | A | * | 10/1998 | Dent | 380/270 |
| 5,940,602 | A | * | 8/1999 | Narayan et al. | 712/213 |
| 6,594,361 | B1 | * | 7/2003 | Chaney et al. | 380/221 |
| 7,367,045 | B2 | * | 4/2008 | Ofek | H04L 47/10 |
| | | | | | 380/255 |

(Continued)

FOREIGN PATENT DOCUMENTS

| | | |
|---|---|---|
| EP | 1742474 | 1/2007 |
| FR | 2866772 | 8/2005 |

(Continued)

OTHER PUBLICATIONS

Ubiquitous Mobile Access to Real-time Patient Monitoring Data|http://web.cinc.org/archives/2002/pdf/557.pdf|Nelwan et al.|2002|pp. 557-560.*

(Continued)

*Primary Examiner* — Mahfuzur Rahman
(74) *Attorney, Agent, or Firm* — Occhiuti & Rohlicek LLP (57) ABSTRACT

The invention pertains to a method for transmitting a piece of additional data from a security processor to an external apparatus, in which the transmission of the piece of additional data is done by delaying (98) the start of a transmission of an information frame from the security processor to the external apparatus by a time lag that is a function of the value of this piece of additional data.

20 Claims, 4 Drawing Sheets

(56) References Cited

U.S. PATENT DOCUMENTS

| | | | |
|---|---|---|---|
| 7,869,409 B2* | 1/2011 | Ivonnet | H04B 1/707 370/335 |
| 8,112,753 B2* | 2/2012 | Van Riel et al. | 718/102 |
| 2002/0085536 A1* | 7/2002 | Rudrapatna | 370/352 |
| 2003/0152052 A1* | 8/2003 | Kekki et al. | 370/335 |
| 2006/0253399 A1* | 11/2006 | Chatani | 705/52 |
| 2008/0031136 A1* | 2/2008 | Gavette et al. | 370/235 |
| 2008/0045145 A1* | 2/2008 | Nakatsugawa | 455/11.1 |
| 2009/0080406 A1* | 3/2009 | Gopal et al. | 370/350 |
| 2009/0323949 A1* | 12/2009 | Chieze et al. | 380/239 |
| 2010/0098393 A1* | 4/2010 | Murabayashi | 386/124 |
| 2011/0224935 A1* | 9/2011 | Hampel | G01D 4/004 702/85 |
| 2012/0020417 A1* | 1/2012 | Wei | H04J 3/0638 375/259 |

FOREIGN PATENT DOCUMENTS

| | | |
|---|---|---|
| WO | WO 99/57901 | 11/1999 |
| WO | WO 2004/014075 | 2/2004 |
| WO | WO 96/06504 | 2/2006 |
| WO | 2008/025900 | 3/2008 |

OTHER PUBLICATIONS

Francis et al., "Countermeasures for attacks on satellite TV cards using open receivers", Australasian Information Security Workshop: Digital Rightsmanagement, XX, XX, 1-6, 2004.

Wang et al. "An Interval Centroid Based Spread Spectrum Watermark for Tracing Multiple Network Flows" IEEE International Conference on Systems, Man, and Cybernetics, pp. 4000-4006 (2009).

EBU Project Group B/CA "Functional Model of a Conditional Access System" EBU Technical Review, pp. 64-77 (1995).

* cited by examiner

TRANSMISSION, RECEPTION AND IDENTIFICATION METHODS, SECURITY PROCESSOR AND INFORMATION RECORDING MEDIUM FOR SAID METHODS

CROSS REFERENCE TO RELATED APPLICATIONS

This application is the national stage entry under 35 USC 371 for PCT/EP2009/067025, filed Dec. 14, 2009, which claims the benefit of the Dec. 31, 2008 priority date of French Application No. 0807518. The contents of both the foregoing applications are incorporated herein by reference.

The invention pertains to a method for the transmission of a piece of additional data by a security processor to an external apparatus. The invention also pertains to:
 a method for receiving the piece of additional data thus transmitted,
 a method for identifying a security processor using this transmission method, and
 a method for transmitting a piece of additional data from an external apparatus to a security processor.

Finally, the invention pertains to a security processor and an information-recording carrier for implementing these methods.

A security processor is a component capable of carrying out processing operations for protecting a system, especially cryptography operations such as operations for enciphering and deciphering, and for storing sensitive data. In this respect, this component is itself particularly secured to make it difficult to attempt any crypto-analysis. The security processor is connected to one or more apparatuses that are external and therefore less secured against crypto-analysis attempts. These external apparatuses therefore give it data to be processed such as cryptograms. The security processor processes these pieces of data and then transmits the result of this processing to the external apparatuses. It can be understood therefore that the analysis of the working of these external apparatuses gives no information on the cryptography operations performed by the security processor.

The security processor and the external apparatus communicate by exchanging information frames using a communications interface. An information frame consists of a succession of bits. Typically, the transmission of the frames between the security processor and the external apparatus is asynchronous. Thus, an information frame is formed by a particular pattern of bits signaling the start of the frame and another particular pattern of bits signaling the end of the frame. The structure of this frame is generally defined by a standard. Compliance with this standard on the part of the security processor and the external apparatus enable the exchange of information between these two entities through the standardized interface. This standard defines the position of the fields contained in the frame as well as the encoding used to transmit the information bits forming the frame. For example, the interface between the security processor and the external apparatus to which it is directly connected is compliant with ISO 7816 standard.

The security processor can be incorporated non-detachably within an external apparatus. In this case, it is called an "embedded" security processor. The security processor then takes for example the form of a hardware component dedicated to these functions. The security processor is often also simply connected detachably to an external apparatus. In this case, it often takes the form of a chip card.

The external apparatus may be the apparatus to which the security processor is directly connected or any apparatus external to the security processor with which the security processor exchanges information. In the latter case, it is not necessary for the external apparatus to be directly connected to the security processor. For example, the external apparatus can be connected to the security processor through other external apparatuses.

There are situations where it is desirable to exchange a piece of additional data between the security processor and an external apparatus to which it is connected without modifying the content of the information frame transmitted or its structure. For example, one of the reasons for acting thus is to transmit a piece of additional data stealthily, i.e. in a manner that is almost undetectable by an ill-intentioned individual who might be listening in to and analyzing the information exchanges between the security processor and this external apparatus. Indeed, such a person extracts and analyses the content of the information frames in compliance with what is laid down by the standard. This means that if the additional data is transmitted without modifying the structure of the frame or its content, there is little chance that this person will detect the transmission of this piece of additional data. It is then said that the additional data is transmitted on a concealed channel or subliminal channel.

The invention is therefore aimed at transmitting data stealthily between a security processor and an external apparatus connected to each other by means of an asynchronous information-transmission link.

An object of the invention therefore is a method for transmitting a piece of additional data from a security processor to an external apparatus, wherein the transmission of the piece of additional data is done by delaying the start of a transmission of an information frame from the security processor to the external apparatus by a time lag that is a function of the value of this piece of additional data.

The above method makes it possible to transmit additional data without modifying the content or the structure of the information frames sent by the security processor to the external apparatus. Nor does it require the transmission of additional information frames as compared with the information frames that would be transmitted in any case. It is therefore difficult to identify the way in which the piece of additional data is transmitted. Furthermore, this enables the piece of additional data to be sent to the external apparatus in addition to the pieces of data contained in the information frame without using extra bandwidth. In this sense, this increases the bandwidth available overall for transmitting information between the security processor and the external apparatus.

Finally, the elimination of the concealed channel thus created is made difficult by the fact that it is difficult to eliminate information frames since these frames convey information which, besides, is often necessary for the efficient operation of a secured system.

The embodiments of this transmission method may comprise one or more of the following characteristics:
 the method comprises the deciphering, by the security processor, of a piece of confidential information and the encapsulation of this piece of deciphered confidential information in the delayed information frame;
 the confidential information is a control word used to decipher a scrambled multimedia content;
 the method comprises:
  the choice of a group of possible time lag values, as a function of the value of the piece of additional data, from amongst several different groups of possible time lags, the random drawing of the time lag used to delay the start of the transmission of the information frame solely in the group chosen as a function of the value of the piece of additional data, for a predetermined value of the piece of additional data, the transmission of the information frame to the external apparatus is cancelled;

the method comprises:

the determining of the time lag to be applied to delay the start of the transmission of the information frame as a function of the value of the piece of additional data, and the use of time lags that are functions of the same value of the piece of additional data in order to routinely delay the start of the transmission of several predetermined information frames;

the information frame, for which the start of the transmission is delayed, is chosen as a function of the value of the piece of additional data to be transmitted;

the method comprises the building of the information frame independently of the piece of additional data.

These embodiments of the transmission method furthermore have the following advantages:

delaying the information frames containing the confidential information deciphered by the security processor makes it harder to eliminate the concealed channel because it is difficult for an ill-intentioned individual to filter these information frames;

the random drawing of the time lag used to delay the start of the transmission of the frame in one group, chosen as a function of the value of the piece of additional data, makes it even more difficult to identify the concealed channel;

the possibility of canceling a transmission inhibits certain functions of the security processor;

the fact of delaying the transmission of several information frames by a same time lag then makes it possible, through a statistical processing by the external equipment, to overcome the effects of random values on the time taken to compute and transport the information frame;

the absence of the piece of additional data in the delayed information frame amounts to an increase in the bandwidth available between the security processor and the external apparatus.

An object of the invention is also a method of reception by the external apparatus of the piece of additional data transmitted by the security processor by means of the above method of transmission, wherein the method comprises the obtaining of the value of the piece of additional data transmitted from the time lag used to delay the information frame.

The embodiments of this method of reception may comprise the following characteristics when each piece of additional data is transmitted in response to a request, these requests being transmitted at predetermined intervals:

the method comprises:

the building of an instant of sending a request as a function of the predetermined interval, the marking of the instant of reception of the information frame transmitted in response to the request, and the obtaining of the value of the piece of additional data from the difference between the marked instant of reception and the built instant of sending.

An object of the invention is also a method for identifying a security processor, this method comprising:

the transmission by the security processor of a piece of identification data as a function of an identifier of this security processor to an external apparatus, the identifier of the security processor making it possible to identify this security processor uniquely from amongst all the security processors liable to be used, the reception by the external apparatus of the transmitted piece of identification data, the determining of a restricted group of possible identifiers for this security processor from this piece of identification data, and wherein the transmission by the security processor of the piece of identification data is done by means of the above transmission method.

This method of identifying a security processor is particularly efficient because it is difficult to identify the way in which the security processor transmits information on its identifier to the external apparatus.

The embodiments of this method of identification may comprise the following characteristic:

the reception of the piece of identification data is done by means of the above reception method.

An object of the invention is also a method for the transmission of a piece of additional data by an external apparatus to a security processor wherein the transmission of a piece of additional data is achieved by delaying the start of a transmission of an information frame from the external apparatus to the security processor, by a time lag that is a function of the value of the piece of additional data.

An object of the invention is also a security processor comprising a module for transmitting a piece of additional data to an external apparatus. This transmission module is capable of carrying out the transmission of the piece of additional data by delaying the start of a transmission of an information frame from the security processor to the external apparatus by a time lag that is a function of the value of this piece of additional data.

Finally, an object of the invention is also an information-recording carrier comprising instructions for the execution of the above methods when these instructions are executed by an electronic computer.

The invention will be understood more clearly from the following description, given purely by way of a non-exhaustive example and made with reference to the drawings of which.

In these figures, the same references are used to designate the same elements.

Here below in this description, the characteristics and functions well-known to those skilled in the art are not described in detail. Furthermore, the terminology used is that of access systems conditional on scrambled multimedia contents. For more information on this terminology, the reader may refer to the following document:

« Functional Model of Conditional Access System », EBU Review—Technical European Broadcasting Union, Brussels, BE, no. 266, 21 Dec. 1995.

Figure 1:
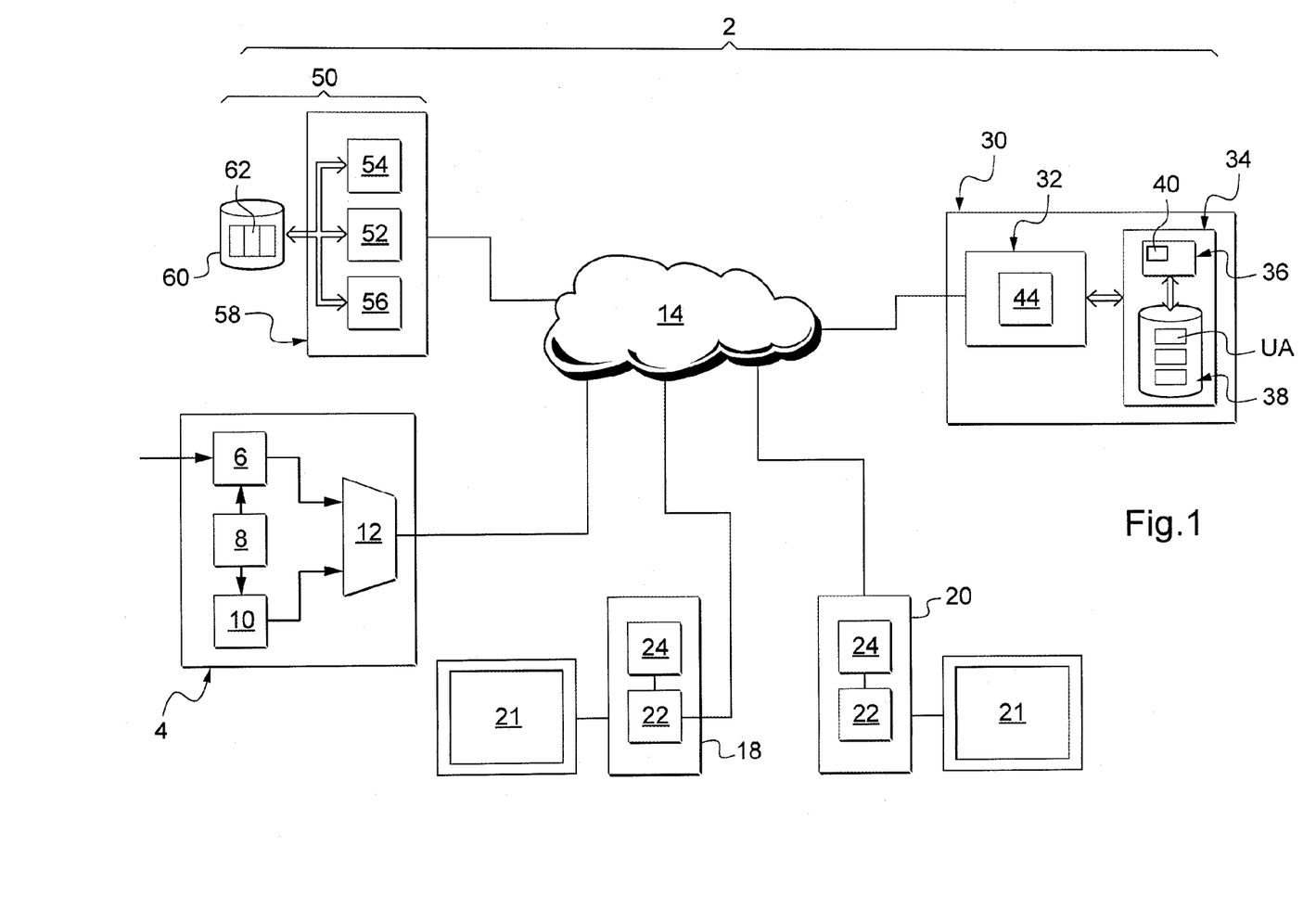
FIG. 1 is a schematic illustration of a system for broadcasting scrambled multimedia content.

FIG. 1 represents a system 2 for broadcasting scrambled multimedia contents. The multimedia content contains video and/or audio material. For example, the multimedia content is a film or a television show. These systems are well known and only the elements essential to an understanding of the following description are described in detail.

The system 2 comprises a sender 4 of scrambled multimedia content. To this end, the sender 4 comprises:
- a scrambler 6 capable of receiving the non-scrambled multimedia content and outputting the scrambled multimedia content by means of a control word CW,
- a control word generator 8 providing the scrambler 6 with the control words to be used, and
- a generator 10 of ECMs (entitlement control messages).

It may be recalled here simply that ECMs messages comprise at least one cryptogram CW* of the control word CW used to scramble the multimedia content.

The control word is changed at regular intervals. The time slot during which the control word remains unchanged is a crypto-period. Classically, crypto-periods last less than one minute. For example, a crypto-period lasts ten seconds.

Outputs from the scrambler 6 and the generator 10 are connected to respective inputs of a multiplexer 12. The multiplexer 12 multiplexes the scrambled multimedia content with the ECM messages generated to obtain a multiplexed multimedia content. The multiplexed multimedia content is broadcast on an information transmission network 14. For example, the network 14 is a packet-switching network such as the Internet. The network 14 may also be formed by several different types of networks connected to one another. For example, the network 14 can be formed firstly by a DVB-S satellite network and secondly by the Internet.

The multiplexed multimedia content thus broadcast is designed to be received by subscriber terminals. These subscriber terminals then demultiplex multiplexed multimedia content to obtain firstly these ECM messages and secondly the scrambled multimedia content and then submit the ECM messages to their associated security processors which process them as a function of preliminarily obtained access rights that they memorize. As the case may be, these security processors subsequently return the deciphered control word CW to the terminals which may thus de-scramble the multimedia content before displaying in unencrypted form on a screen. The expression "unencrypted form" indicates that the de-scrambled multimedia content displayed on the screen is directly intelligible to a human being.

Rather than such subscriber terminals, the FIG. 1 shows only "hacker" terminals. These hacker terminals are used to display multimedia contents in unencrypted form without payment of the corresponding subscription, i.e. without the obtaining of access rights that permit legitimate viewing. Typically, these hacker terminals obtain de-scrambled control words CW from a service which itself is a hacking service given on the Internet. In FIG. 1, the two hacker terminals 18 and 20 shown are for example identical. Thus, only the terminal 18 is described in greater detail.

The terminal 18 is connected to a screen 21 such as a television screen. The terminal 18 is equipped with:
- a decoder 22 connected to the network 14 to receive the multiplexed multimedia content broadcast by the sender 4, and
- a de-scrambler 24.

The decoder 22 demultiplexes the multimedia content in order to extract the scrambled multimedia content from it.

The de-scrambler 24 de-scrambles or deciphers the scrambled multimedia content by using the control word CW. To this end, this de-scrambler 24 must receive the control word CW in unencrypted form. To this end, the terminal 18 is connected to a control-word-sharing device 30. For example, here the terminal 18 is connected to the device 30 by means of the network 14.

The device 30 is equipped with a decoder 32 and an authentic security processor 34 directly connected to the decoder 32. The term "authentic security processor" designates a security processor that has been legally obtained in return for a subscription to the services of the operator who is broadcasting the multimedia content. This processor is therefore structurally identical to those contained in the subscriber terminals. The rights of access to the multimedia content are also regularly updated in the processor 34 so long as the subscription has been paid. This updating is done as in the case of the security processors connected to subscriber terminals.

The decoder 32 demultiplexes the multiplexed multimedia content broadcast by the sender 4 to extract the ECMs from it. These ECMs are then transmitted to the security processor 34 which then deciphers the cryptogram CW* to obtain the control word CW. Then, the processor 34 sends the decoder 32 an information frame containing the control word CW as it would have done if it were connected to a subscriber terminal.

Here, the security processor 34 is a chip card connected detachably to the decoder 32 by means of a communications interface compliant with the ISO 7816 standard. The decoder 32 is therefore an external apparatus to which the processor 34 transmits data.

The processor 34 has an electronic computer 36 capable of executing the instructions recorded on an information-recording carrier. To this end, the computer 36 is connected to a memory 38 which contains the instructions needed to execute the method of FIG. 3. In particular, these instructions encode a module 40 for transmitting additional data on a concealed channel. The memory 38 also has:
- an identifier UA of the security processor, and
- the cryptographic keys and the access rights necessary for deciphering the cryptograms CW*.

The identifier UA enables the identification uniquely of the processor 34 from among all the authentic security processors used in the system 2.

Unlike the subscriber terminals, the decoder 32 is equipped with a broadcaster 44 of control words. This broadcaster 44 broadcasts the control word transmitted by the processor 34 to external apparatuses which are recorded for example in a broadcasting list kept by the device 30. The hacker terminals 18 and 20 are recorded in this list to receive the control word CW deciphered by the processor 34. Here, a tapping or eavesdropping station 50 is also recorded in this list and therefore also forms an external apparatus to which the processor 34 transmits the deciphered control words.

The station 50 is designed to listen to the information broadcast by the device 30 in order to identify the processor 34 used by this device 30. To this end, the station 50 comprises:
- a module 52 for receiving both the multiplexed multimedia content broadcast by the sender 4 and control words broadcast by the device 30,
- a decoder 54 capable of demultiplexing the multimedia content, and
- a processing module 56 to obtain the data transmitted by the processor 34 on the concealed channel.

The module 52, the decoder 54 and the module 56 are typically software modules implemented in a computer 58. This computer 58 is connected to a memory 60. The memory 60 contains the instructions needed to execute the method of FIG. 3 when they are executed by the computer 58. This memory 60 also has a tapping table 62.

Figure 2:
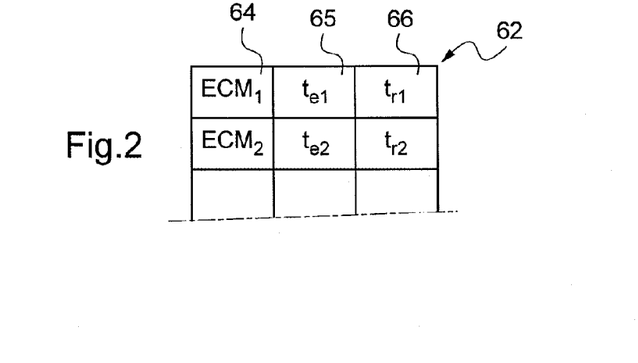
FIG. 2 is a schematic illustration of a tapping or eavesdropping table used in the system of FIG. 1.

FIG. 2 gives a more detailed view of the table 62. The table 62 has three columns 64 to 66. The first column 64 is designed to contain ECM identifiers. For example, the column 64 contains $ECM_1$ and $ECM_2$ identifiers of two different ECMs.

The column 65 contains instants $t_e$ of sending of the ECM messages identified by the identifiers contained in the column 64. For example, here, the column 65 contains the instants $t_{e1}$ and $t_{e2}$.

Finally, the column 66 contains the instants $t_r$ of reception of the control words CW broadcast by the device 30. For example, the column 66 contains the instants $t_{r1}$ and $t_{r2}$ respectively associated with the identifiers $ECM_1$ and $ECM_2$.

The working of the system 2 shall now be described in greater detail with reference to the method of FIG. 3.

Initially, at a step 70, the station 50 subscribes to the broadcasting list of the device 30 to receive the control words deciphered and broadcast by this device.

Then, at a step 71, the station 50 builds the instant $t_e$ of the sending by the sender 4 of an ECM for each crypto-period. For example, the station 50 generates the instant $t_e$ of sending of an ECM message in each crypto-period with the same periodicity as that used to send the ECM messages. Indeed, the ECM messages are sent periodically, generally just before the end of the previous crypto-period. It is not necessary for the instant $t_e$ to correspond precisely to the instant at which the sender 4 broadcasts the ECM message. It is enough for the following instants $t_e$ generated to have the same periodicity as that used to send the ECMs. As the case may be, the periodicity of sending of the ECMs is deduced from the periodicity with which the control words broadcast by the device 30 are received.

Then, a phase 72 is performed for sending a request for identifying the processor 34 and receiving the corresponding response. More specifically, at a step 74, the scrambled multimedia content broadcast by the sender 4 is multiplexed with a message $ECM_1$ containing a request $R_1$. The request $R_1$ targets a restricted group $G_1$ of security processors. This group is restricted in the sense that is contains fewer security processors than possible in the system 2. More specifically, this request is aimed at finding out whether or not the processor 34 belongs to the group $G_1$. For example, the group $G_1$ is constituted by all the security processors whose identifier UA starts with a bit at "1". This ECM message $ECM_1$ is broadcast to all the external apparatuses connected to the network 14.

At a step 76, the multiplexed multimedia content is therefore received by the device 30 and by the hacker terminals 18 and 20.

At a step 78, the hacker terminals 18, 20 demultiplex the multimedia content received to extract the scrambled multimedia content therefrom. The device 30 demultiplexes the multimedia content received to extract the $ECM_1$ therefrom.

At the step 80, the module 56 of the station 50 builds the ECM sending instant $t_{e1}$. The instant $t_{e1}$ is recorded in the table 62. For example, the instant $t_{e1}$ is built by adding the duration of one crypto-period to the previous $t_e$ built.

At the same time, in a step 82, the decoder 32 of the device 30 transmits the $ECM_1$ to the processor 34.

At a step 84, in response to the reception of this step $ECM_1$, the processor 34 determines whether or not this message comprises a request such as the request $R_1$. If the answer is yes, it goes to a step 86 for computing a piece of additional data D and a time lag $\Delta$. This data D is the response to the request $R_1$. Here, the data D is a Boolean piece of data since there are only two possible responses to the request $R_1$, i.e. either the processor 34 belongs to the group $G_1$ or it does not belong to this group.

For example, the step 86 starts with an operation 88 during which the processor 34 determines whether its identifier UA starts with one bit at 1. If the answer is yes, the piece of data D is then taken to be equal to 1 and, during the operation 90, has a predetermined constant duration $d_1$ associated with it. If not, at an operation 92, the piece of data D, which is taken to be equal to 0, has a predetermined constant duration $d_0$ associated with it. For example, the duration $d_0$ is null and the duration $d_1$ is chosen to be greater than the jitter of the signals transmitted by the processor 34 to the station 50. For example, the duration $d_1$ is greater than 1 ms. The durations $d_0$ and $d_1$ are the two possible durations of a time lag $\Delta$.

Then, at the end of the step 86 or should the ECM received by the processor comprise no request, a step 94 is performed for deciphering the cryptogram CW*.

At a step 96, the processor 34 subsequently builds a frame containing the deciphered control word CW. This frame is compliant with the ISO 7816 standard.

Then, at a step 98, the processor 34 delays the transmission, to the decoder 32, of the frame built at the step 96, by the time lag $\Delta$ with the duration $d_1$ or $d_0$ depending on the value of the piece of data D computed at the step 86.

The two cases that can occur at the step 98 are shown in greater detail in the timing diagrams of FIGS. 4 and 5 which are described further below.

After a wait during the time lag $\Delta$, the frame is immediately broadcast on the network 14.

At a step 100, the hacker terminals 18 and 20 as well as the station 50 receive the frame containing the control word deciphered by the processor 34.

At a step 102, the decoder 22 of the hacker terminals extracts the control word CW from the received frame and transmits it to the de-scrambler 24 which can then de-scramble the scrambled multimedia content received.

In parallel, at a step 104, the station 50 marks the instant $t_{r1}$ of reception of the frame containing the control word CW. This instant $t_{r1}$ is recorded in the table 62 associated with the identifier of the message $ECM_1$.

The phase 72 is completed and the new phase 106 for sending a new request and for receiving the corresponding response starts. This phase 106 is identical to the phase 72 except that the ECM sent is a message $ECM_2$ containing a request $R_2$ which targets a group $G_2$. For example, the group $G_2$ is built so that the intersection with the group $G_1$ is empty and its union with the group $G_1$ corresponds to the set of security processors usable in the system 2. Here, the group $G_2$ is constituted by the set of processors whose identifier UA starts with one bit at zero. The instants of the sending of this message $ECM_2$ and of the reception of the deciphered control word are registered as instants $t_{e2}$ and $t_{r2}$ in the control table 62.

Figure 6:
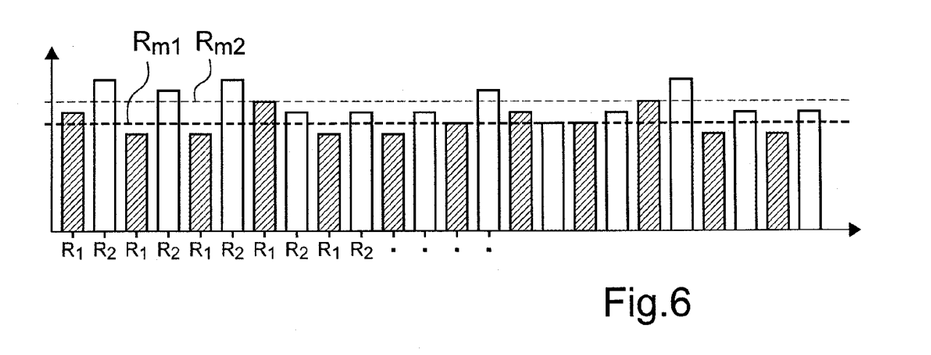
FIG. 6 is a graph illustrating an example of content of the tapping table of FIG. 2, FIGS. 7 and 8 are schematic illustrations of two information frames transmitted to a security processor of the system of FIG. 1.

The phases 72 and 106 are reiterated several times each. For example, they are each reiterated more than ten times and preferably more than 100 times. For example, the phases 72 and 106 are reiterated alternately. This makes it possible to register the sending instants $t_e$ and the reception instants $t_r$ to the requests $R_1$ and $R_2$ a great many times. These instants are recorded in the table 62. FIG. 6 is a graph representing a part of the content of the table 62 obtained by reiterating the phases 72 and 106 alternately.

In this graph, each vertical bar represents the response time to a request. The hatched bars represent the response time to the request $R_1$ while the blank bars represent the response time to a request $R_2$. The height of each of these bars is a function of the response time. The response time is equal to the difference between the instants $t_e$ and $t_r$ recorded for the same ECM in the table 62.

As illustrated in this graph, the difference between the instants $t_e$ and $t_r$ in response to the same request varies whenever this request is sent. This variation is due to random factors in the propagation time of the ECM and of the deciphered broadcast control word CW as well as interposed messages, i.e. exchanges in the time slot demarcated by the exchanges of the previous time slots, through the network 14. These variations may also be due to random factors in the computation time of the processor 34.

After the phases 72 and 106 have been reiterated a large number of times, the module 56 goes to a phase 108 for obtaining the piece of data D in processing the instants recorded in the table 62. For example, during an operation 110, the module 56 computes the average $R_{m1}$ of the response times to the request $R_1$. At the step 110, the module 56 also computes the average $R_{m2}$ of the response time to the request $R_2$.

Then, in an operation 112, the module 56 determines whether the mean response time to the request $R_1$ is greater than the mean response time to the request $R_2$. If the answer is yes, it carries out an operation 114 during which it is established that the time lag Δ has a duration $d_1$ and that the piece of data D transmitted in response to the request $R_1$ is therefore equal to 1. In this case, the station 50 determines that the processor 34 belongs to the group $G_1$. If not, an operation 116 is carried out during which it is established that the time lag Δ has a duration $d_0$ and that the piece of data D transmitted in response to the request $R_1$ is therefore equal to 0. This means that the processor 34 belongs to the group $G_2$. Indeed, as indicated here above, the sending of the information frame by the processor 34 is delayed by the time lag $d_1$ when this processor belongs to the group targeted by the received request.

The average values $R_{m1}$ and $R_{m2}$ are represented in FIG. 6 by horizontal dashed lines.

At the end of the phases 76 to 78, it is therefore been possible to identify the group $G_1$ or $G_2$ to which the processor 34 belongs. Here, the processor 34 belongs to the group $G_2$.

Then, the steps 72 to 108 are reiterated by targeting, during the phases 72 and 106 respectively, groups $G_3$ and $G_4$. These groups $G_3$ and $G_4$ are built so that the intersection of these two groups is zero and so that the union of these two groups is equal to the group $G_2$.

Thus, it is possible to gradually, by successive cross-checking, to determine the identity of the processor 34 until it becomes possible to identify it uniquely among all the processors usable in the system 2.

Figure 4:
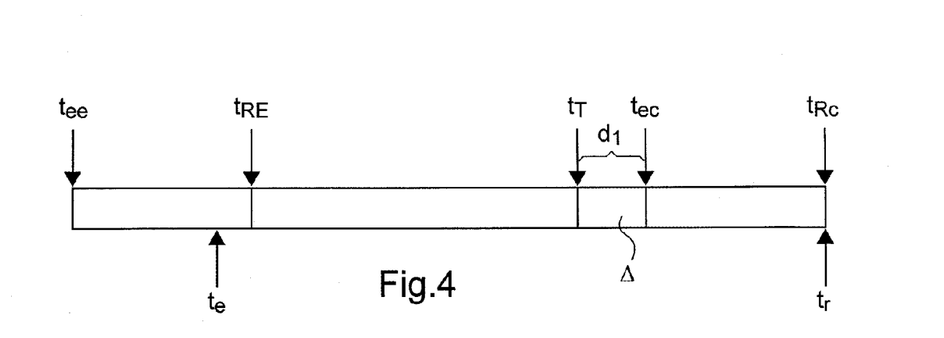

FIG. 4 represents a timing diagram of the sending and reception of a response to a request. At the instant $t_{ee}$, the ECM containing the request is sent by the sender 4. There may be a gap between the instants $t_{ee}$ and $t_e$ as shown in FIGS. 4 and 5. This gap is constant. The message containing the request reaches the device 30 at an instant $t_{Re}$. The difference between the instants $t_{Re}$ and $t_{ee}$ corresponds to the time of transportation of the ECM from the sender 4 up to the processor 34.

Starting from the instant $t_{Re}$ onwards, the processor 34 processes the received ECM. The processing ends at the instant $t_T$. The difference between the instants $t_T$ and $t_{Re}$ corresponds to the computation time needed by the processor 34 to process the ECM. This computation time includes especially that taken for deciphering the program CW* and for the subsequent building of the frame containing the deciphered control word CW.

Should the processor 34 belong to the group targeted by the received request, the sending of the frame containing the deciphered control word CW is delayed by the time lag Δ whose duration is computed as a function of the data D at the step 86. After a wait during this time lag Δ, at the instant $t_{ec}$, the frame is immediately transmitted by the processor 34 to the decoder 32. Then, the frame that has just been transmitted reaches the tapping station 50 at a given point in time $t_{RC}$. This instant $t_{RC}$ is recorded as an instant $t_r$ by the module 56. The difference between the instants $t_{RC}$ and $t_{ec}$ corresponds to the time of transportation of this frame from the processor 34 up to the station 60.

The transportation time as well as the processing time may vary pseudo-randomly. Thus, only a statistical processing of the response times to the request as described with respect to the phase 108 makes it possible to obtain the piece of additional data transmitted on the concealed channel.

Figure 5:
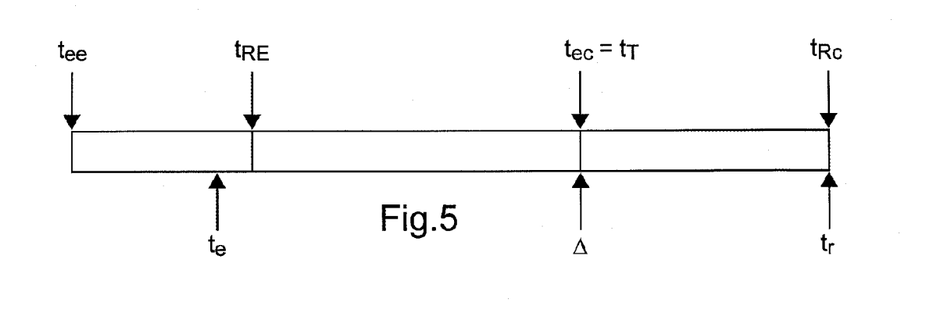

FIG. 5 represents the same timing diagram as that of FIG. 4 but in the particular case where the processor does not belong to the group targeted by the request. The time lag Δ is therefore zero.

The fact of delaying the sending of an information frame does not modify the content or structure of this frame. It is therefore very difficult for this delay to be perceived by the uninformed user. Thus, the method of FIG. 3 makes it possible to transmit additional data from the processor 34 to an external apparatus in an extremely discreet manner.

Figure 7:
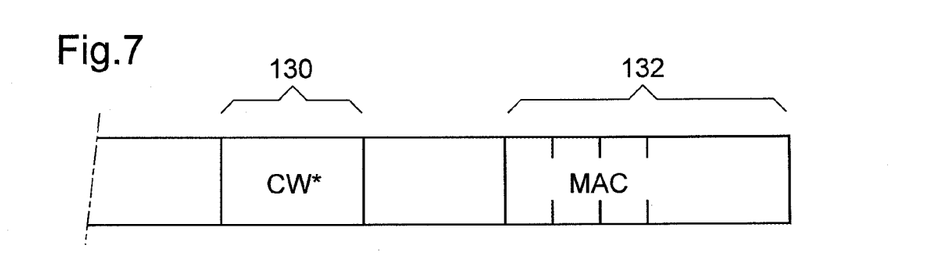

However, in order that the transmission of additional data from the processor 34 to an external apparatus may remain stealthy, it is also necessary to mask the request contained in the ECMs as efficiently as possible. To this end, FIG. 7 represents an ECM devoid of requests. Classically, this ECM furthermore comprises a field 130 containing the cryptogram CW* and comprising a cryptographic redundancy 132 called MAC (message authentication code) encoded on 128 bits. This cryptographic redundancy makes it possible to check the integrity of the ECM. It is typically built by applying a hash function to the content of the ECM message and especially in taking account of the cryptogram CW*.

Figure 8:
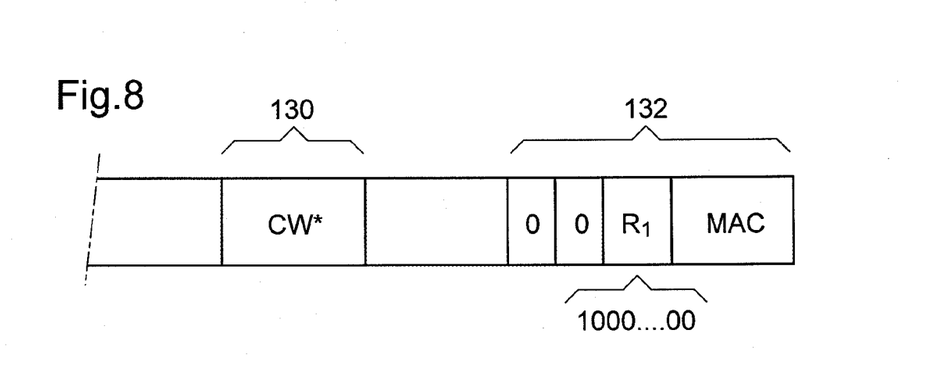

FIG. 8 shows an ECM containing a request. Here, this request is masked in the MAC field of the ECM. For example, this MAC field starts here with two successive bits at zero. This is recognized by the processor 34 as indicating the presence of a request in this field. Here, this request is encoded by means of the following 62 bits. The last 64 bits of the MAC field then contain a signature of the message encoded on 64 bits instead of 128 bits. This makes it possible all the same to check the integrity of the ECM message.

The request $R_1$ takes the form for example of a vector of bits intended for one-to-one comparison with the bits of the UA identifier. For example, here, the request $R_1$ is encoded in the form of a succession of 62 bits, of which only the first bit is equal to "1". This code is interpreted by the processor 34 as defining a group of security processors for which the most significant bit of the UA identifier is equal to "1".

Preferably, the content of the MAC field is enciphered with a key known to the security processors. Thus, the processors decipher the content of the MAC field with this key before using this content.

Many other embodiments are possible. For example, each request can define a lower limit $B_{inf}$ and an upper limit $B_{sup}$. If the identifier UA of the processor 34 is obtained in the segment $[B_{inf}; B_{sup}]$, then the response D to the received request is "yes" and the sending of a subsequent information frame is delayed by a time lag Δ having a duration $d_1$. If not, the transmission of the subsequent information frame is not delayed.

A request may if necessary target only one card. In this case, the group is restricted to only one security processor. For example, in this case, the message $ECM_1$ will target only the identifier UA of the card 34.

The restricted groups may be designed to identify the bits of the identifier UA one after the other. For example, a first request targets the security processors for which the first bit of the UA identifier is equal to one. Then, a second request targets the security processors for which the second bit of the identifier UA is equal to one and so on and so forth. By acting in this way, it becomes possible to identify those bits of the identifier UA that are equal to one and hence the corresponding security processor.

The time lag $\Delta$ may take more than two different values. For example, the request contains a vector of bits which must be combined with the identifier UA by the processor 34. The combination operation consists for example in carrying out the XOR operation between this vector of bits and the identifier UA. The result of this combination then determines the value of the time lag $\Delta$ to be used to delay the sending of the information frame. Then, during the phase 106, another vector is used. The reiteration of the phases 72 and 106 for a large number of different vectors makes it possible then for a processor to identify or more pinpoint the identity of the processor 34 more precisely.

Even if the time lag $\Delta$ is limited to two possible values, it is not necessary that one of these values should be null.

As a variant, the device 30 may use several authentic security processors to decipher the cryptogram CW*. It is assumed that the deciphered control word is broadcast uniquely by the security processor which has been the fastest in deciphering the cryptogram CW*. The frames transmitted by the other security processors which were slower are not broadcast to the tapping station. In this case, it possible to build a strategy for identifying each of the security processors used by the device 30 for sharing the control word. For example, should the device 30 use two different security processors, at least three groups $G_1$, $G_2$, $G_3$ are created such that the union of these groups in sets of two corresponds to all the security processors used in the system 2. This makes it possible to identify at least one group and at most two groups to which the security processors belong. It is therefore possible to subsequently define a more restricted set to which the two security processors belong. By again dividing this more restricted set into three groups in a similar manner and by identifying the group or groups to which the shared processors belong, it becomes possible, little by little, to identify the two security processors used by the device 30. For example, it is assumed that the system 2 has nine security processors numbered 1 to 9. The processors 1 and 5 are used by the device 30. Initially, the following three groups are created:

the group $G_1$ which groups together all the processors except the processors 1 to 3;
the group $G_2$ which groups together all the processors except the processors 4 to 6, and
the group $G_3$ which groups together all the processors except the processors 7 to 9.

Then, the phases 72, 106 and 108 are implemented to identify the group to which the processors used by the device 30 belong. Given that no delay is made in the sending of the control word by the security processor that does not belong to the group targeted by the received request, this response is broadcast before that of the processor which belongs to the targeted group. Thus, the tapping station receives only the response from the processor that does not belong to the targeted group. This means that, for the station 50 to receive a response informing it that the processors belong to the targeted group, it is necessary that the two processors should belong simultaneously to this group. When the requests target the groups $G_1$ and $G_2$, the received response is "no". On the contrary, when the request targets the group $G_3$, the received response is "yes", i.e. the targeted processors belong to this group $G_3$.

Then, the group $G_3$ is divided into three new groups $G_4$, $G_5$ and $G_6$. The groups $G_4$, $G_5$ and $G_6$ respectively group together the processors 1 2 3 4, 1 2 5 6 and 3 4 5 6.

By repeating the steps 72 to 108, in using this distribution into groups, the station 50 determines that the processors used by the device 30 belong to the group $G_5$. Then, the group $G_5$ is divided into three groups $G_7$, $G_8$ and $G_9$ corresponding respectively to the processors 1 2 5, 2 5 6 and 1 5 6. After the broadcasting of the corresponding requests and the processing of the responses, the station 50 determines that the processors used by the device 30 belong to the groups $G_7$ and $G_9$. The shared processors are therefore the processors 1 and 5.

There are many other possibilities for masking the requests in the ECM messages transmitted to the security processor. For example, rather than transmitting a vector of bits to the interior of the MAC field, the invention uses the content of the field 130 or of the field 132 as a vector of bits. It is also possible to use the control word CW deciphered by the security vector as a vector of bits. Then, this vector of bits is combined with the identifier UA of the security processor. For example, this combination is obtained by means of a XOR operation. The result of this combination is encoded in the form of a time lag used to delay the sending of the information frame containing the deciphered control word CW. For example, this time lag is equal to the result of the combination between the vector and the identifier UA. These operations are reiterated on a large number of different vectors. The responses to each ECM sent are recorded in the tapping table. Then, when the number of pieces of information is statistically sufficient, the tapping table is processed so as to try and determine the value of the identifier UA of the processor used by the device 30 with the greatest possible precision. In this embodiment, since the vector also fulfils another function (cryptogram of the control word, cryptographic redundancy etc), of a field of the ECM, this vector is more difficult to detect.

Another solution to masking the requests consists in quite simply not sending any requests. In these embodiments, the transmission of the piece of additional data is for example activated at a fixed time every day. Another possibility consists in activating the transmission of this piece of additional data at an instant which is determined by the security processor as a function of the piece of additional data to be transmitted. Thus, the data to be transmitted is also encoded by the instant at which it is transmitted.

To limit the number of requests transmitted to the security processor, a request is first of all transmitted and then the time lag $\Delta$ corresponding to the piece of data D to be transmitted in response to this request is applied routinely to delaying several predetermined subsequent information frames. For example, all the information frames sent during a predetermined time slot after the reception of this request are delayed by the time lag $\Delta$, without this delay on the following frames being activated by the reception of a new request.

To make the time lag applied to the transmission of the information frame even more difficult to perceive, it is possible to proceed as follows: groups of several possible time lags are built. For example groups $J_1$ and $J_2$ corresponding respectively to the ranges $[n_{11}; n_{12}]$ and $[n_{21}; n_{22}]$ of possible time lags are built. The groups $J_1$ and $J_2$ are distinct and preferably their intersection is empty. Then, the group in which the time lag Δ must be chosen is determined as a function of the piece of data D. Finally, the time lag Δ to be used to delay the transmission of the information frame is drawn randomly in the previously determined group. Thus, following a same request, the time lag used to delay the transmission of a subsequent information frame will not be identical. On the contrary, the tapping station can discriminate between membership of the time lag in the group $J_1$ and membership in the group $J_2$ and can therefore obtain the piece of data D.

If the time of transportation of the information frames between the security processor and the tapping station and the time of computation or of processing of the ECM are constant, it is not necessary to reiterate the phases 72 and 106 several times to obtain the piece of data D. Only one measurement of the time lag Δ suffices.

In one variant, for a given piece of data, the time lag Δ to be used is an infinite time lag, which corresponds to cancelling the transmission of the information frame.

It is possible initially to record all the time lags of response to the requests in the table 62 and then, secondly, to process this table subsequently when it becomes necessary, for example to identify a security processor.

The response to a request does not need to be transmitted immediately by delaying or not delaying the transmission of the next information frame. For example, the time lag Δ is used uniquely to delay the transmission of the nth information frame transmitted by the security processor after the reception of the request, where n is strictly greater than 1. The interposed frames, i.e. the frame immediately following the reception of the request at the (n−1)th frame are not used to encode the response to the request.

The response transmitted by the security processor is not necessarily transmitted by means of only one information frame. For example, the response to a request is formed by several pieces of data, each piece of data corresponding to a particular value of the time lag Δ. In this case, several information frames are needed to transmit the full response. Thus, a single request can activate this sending of several pieces of data on the concealed channel.

Figure 3:
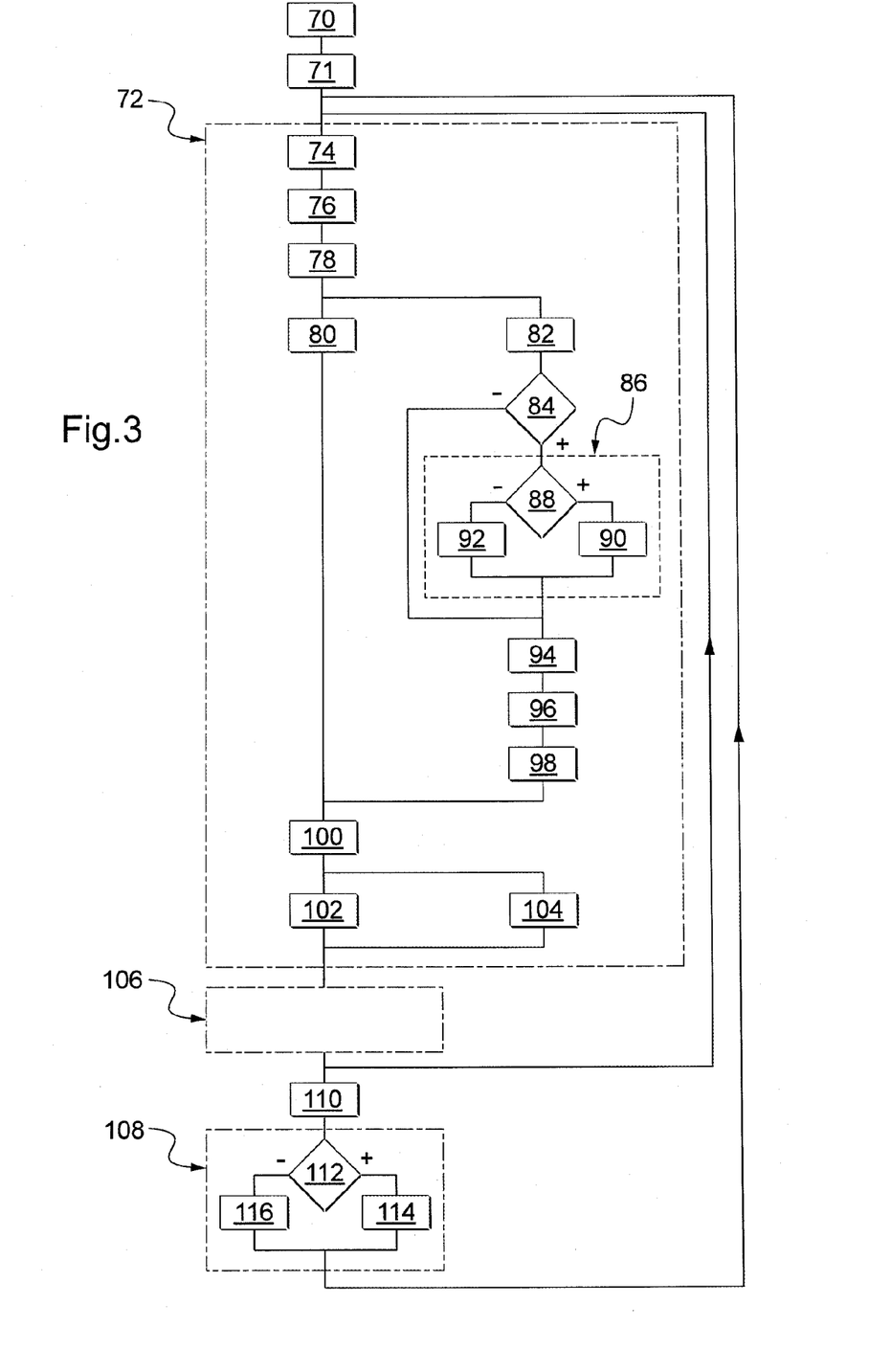
FIG. 3 is a flowchart of a method for identifying a security processor1 implemented in the system of FIG. 1, FIGS. 4 and 5 are timing diagrams illustrating a particular aspect of the method of FIG. 3.

The stealthy transmission of additional data as described herein with reference to the procedure of FIG. 3 can be applied in contexts other than that of the traitor-tracing. For example, the piece of additional data transmitted may correspond to data other than data relative to the identifier UA of the security processor. The delay may also be applied to other information frames than those containing the deciphered control word CW.

The requests transmitted to the security processor may be incorporated in messages other than ECMs. For example, these requests are incorporated in EMM messages.

The security processor may be integrated or simply connected detachably to the de-scrambler. The de-scrambler may itself be integrated or connected detachably to the decoder.

The network used to broadcast the multiplexed multimedia content may also be a satellite network.

It is not necessary for the tapping station 50 to include a decoder in the particular case described with reference to FIGS. 1 and 3.

The method for tracking disloyal individuals described with reference to FIG. 3 can also be applied to attacks known as "card sharing". In these attacks, each hacker terminal transmits the ECM message that it receives to the device 30 which processes it by means of the processor 34 and send it the corresponding response. In this case, the tapping station 50 also receives the multiplexed multimedia content and demultiplexes it in order to extract the ECM therefrom by means of the decoder 54. Then it sends the extracted ECM to the device 30. Subsequently, the device 30 sends the station 50 the control word obtained by the processor 34 by deciphering the cryptogram CW* contained in this ECM. Since the station 50 itself sends the ECM to the device 30, it can directly measure the instant $t_e$ of sending of this message. For example, the instant $t_e$ is taken to be equal to the instant of reception of the ECM by the station 50. As an alternative, the instant $t_e$ is contained in the ECM message itself.

Finally, the implementation of the concealed channel as described here can also be adapted for the stealthy transmission of additional data from an external apparatus to the security processor. To this end, it suffices to apply what has been described here above in reversing the roles of the external apparatus and the security processor. For example, a concealed channel of this kind could be used by the sender 4 and/or the external apparatus 32 to transmit the requests stealthily.

The invention claimed is:

1. A method for causing a security processor to transmit an information frame and a piece of additional data to an external apparatus, said information frame comprising a first bit pattern indicating a start of said frame and a second bit pattern indicating an end of said frame, said method comprising: in response to receiving a request, causing said security processor to compute a value of said piece of additional data, said piece of additional data being a response to said request that is chosen from among at least two possible responses to said request, causing said security processor to compute a time lag that is a function of said computed value of said piece of additional data, and causing said security processor to transmit said piece of additional data by delaying a start of a transmission of said information frame from the security processor to the external apparatus by said time lag; wherein the method further comprises building the information frame independently of the piece of additional data.

2. The method of claim 1, further comprising deciphering, by the security processor, a piece of confidential information, thereby generating a piece of deciphered confidential information, and encapsulating the piece of deciphered confidential information in a delayed information frame.

3. The method of claim 2, wherein the confidential information comprises a control word used to decipher scrambled multimedia content.

4. The method of claim 1, further comprising: providing a choice of a group of possible time lags, as a function of the value of the piece of additional data, from among several different groups of possible time lags, and randomly drawing a time lag used to delay the start of the transmission of the information frame solely from the group chosen as a function of the value of the piece of additional data.

5. The method of claim 1, further comprising determining that the value of the piece of additional data equals a predetermined value, and cancelling the transmission of the information frame to the external apparatus.

6. The method of claim 1, further comprising: determining the time lag to be applied to delay the start of the transmission of the information frame as a function of the value of the piece of additional data, and using time lags that are functions of the same value of the piece of additional data to routinely delay starts of transmissions of several predetermined information frames.

7. The method of claim 1, wherein the information frame for which the start of the transmission is delayed is chosen as a function of the value of the piece of additional data to be transmitted.

8. A method of receiving, by an external apparatus, a piece of additional data transmitted by a security processor that transmitted the piece of additional data by delaying a start of a transmission of an information frame by a time lag that was a function of a value of the piece of additional data, said method comprising: building an instance of sending a request at a first time, marking a second time indicating an instant of reception of an information frame that was transmitted in response to said request, and obtaining the value of the piece of additional data transmitted from a difference between said first and second times, thereby determining the time lag used to delay the information frame; wherein the method further comprises building the information frame independently of the piece of additional data.

9. The method of claim 8, wherein obtaining the value comprises obtaining the value when each piece of additional data is transmitted in response to a request, the requests being transmitted at predetermined intervals, said method further comprising: building an instant of sending a request as a function of the predetermined interval.

10. A method for identifying a security processor, said method comprising: transmitting, by the security processor, to an external apparatus, a piece of identification data as a function of an identifier of the security processor, the identifier of the security processor making it possible to identify the security processor uniquely from among all the security processors liable to be used, receiving, by the external apparatus, the transmitted piece of identification data, and determining a restricted group of possible identifiers for the security processor from the piece of identification data, wherein transmitting the piece of identification data includes delaying a start of a transmission of an information frame from the security processor to the external apparatus by a time lag that is a function of a value of the piece of identification data;
wherein the method further comprises building the information frame independently of the piece of identification data.

11. The method of claim 10, wherein said method is implemented when each piece of additional data is transmitted in response to a request, the requests being transmitted at predetermined intervals, said method further comprising obtaining, from the time lag used to delay the information frame, the value of the piece of additional data transmitted; building an instant of sending a request as a function of the predetermined interval, marking the instant of reception of the information frame transmitted in response to the request, and obtaining the value of the piece of additional data from the difference between the marked instant of reception and the built instant of sending.

12. A method for causing an external apparatus to transmit an information frame and a piece of additional data from an external apparatus to a security processor, said information frame comprising a first bit pattern indicating a start of said frame and a second bit pattern indicating an end of said frame, said method comprising, in response to receiving a request, causing said external apparatus to compute a value of said piece of additional data, said piece of additional data being a response to said request that is chosen from among at least two possible responses to said request, causing said external apparatus to compute a time lag that is a function of said computed value of said piece of additional data, and causing said external apparatus to transmit said piece of additional data by delaying a start of a transmission of said information frame from the external apparatus to the security processor by said time lag; wherein the method further comprises building the information frame independently of the piece of additional data.

13. An apparatus comprising a hardware security processor for transmitting an information frame and a piece of additional data to an external apparatus, said information frame comprising a first bit pattern indicating a start of said information frame and a second bit pattern indicating an end of said information frame, said hardware security processor configured for receiving a request, wherein said hardware security processor is further configured to respond to receiving said request by computing a value of said piece of additional data, said piece of additional data being a response to said request that is chosen from among at least two possible responses to said request, wherein said hardware security processor is further configured to compute a time lag that is a function of said computed value of said piece of additional data, and transmitting said piece of additional data to said external apparatus, whereby said hardware security processor transmits said piece of additional data by delaying a start of a transmission of said information frame from the hardware security processor to the external apparatus by a time lag that is a function of a value of the piece of additional data; wherein the apparatus is configured to build the information frame independently of the piece of additional data.

14. A non-transitory information-recording carrier having encoded thereon software for causing transmission of an information frame and a piece of additional data from a hardware security processor to an external apparatus, said information frame comprising a first bit pattern indicating a start of said frame and a second bit pattern indicating an end of said frame, said software including instructions that, when executed by an electronic computer, cause said electronic computer to respond to receiving a request by computing a value of said piece of additional data, said piece of additional data being a response to said request chosen from among at least two possible responses to said request, instructions that, when executed by said electronic computer, cause said electronic computer to compute a time lag that is a function of said computed value of said piece of additional data, instructions that, when executed by said electronic computer, cause said electronic computer to delay a start of a transmission of said information frame from the hardware security processor to the external apparatus by said time lag; and instructions that, when executed by said electronic computer, cause said electronic computer to build the information frame independently of the piece of additional data.

15. The method of claim 1, wherein said frame is formed by a particular pattern of bits signaling a start of said information frame and another particular pattern of bits signaling an end of said information frame.

16. The method of claim 8, wherein said information frame is formed by a particular pattern of bits signaling a start of said information frame and another particular pattern of bits signaling an end of said information frame.

17. The method of claim 12, wherein said information frame is formed by a particular pattern of bits signaling a start of said information frame and another particular pattern of bits signaling an end of said information frame.

18. The apparatus of claim 13, wherein said information frame is formed by a particular pattern of bits signaling a start of said information frame and another particular pattern of bits signaling an end of said information frame.

19. The information-recording carrier of claim 14, wherein said information frame is formed by a particular pattern of bits signaling a start of said information frame and another particular pattern of bits signaling an end of said information frame.

20. A method for causing a security processor to transmit an information frame and a piece of additional data to an external apparatus, said information frame comprising a first bit pattern indicating a start of said frame and a second bit pattern indicating an end of said frame, said method comprising: in response to receiving a request, causing said security processor to compute a value of said piece of additional data, said piece of additional data being a response to said request that is chosen from among at least two possible responses to said request, causing said security processor to compute a time lag that is a function of said computed value of said piece of additional data, causing said security processor to transmit said piece of additional data by delaying a start of a transmission of said information frame from the security processor to the external apparatus by said time lag; causing the external apparatus to determine said time lag for transmission of said information frame; and causing the external apparatus to identify, from the determined time lag, a group of a plurality of groups to which said security processor belongs; wherein the method further comprises building the information frame independently of the piece of additional data.

* * * * *